(12) United States Patent  
Crooks et al.

(10) Patent No.: US 9,073,003 B2
(45) Date of Patent: Jul. 7, 2015

(54) SYSTEM AND METHOD FOR COLLECTING CARBON DIOXIDE UTILIZING DIELECTRIC HEATING

(71) Applicant: The Boeing Company, Chicago, IL (US)

(72) Inventors: Tab H. Crooks, Dana Point, CA (US); D. Anthony Galasso, Trabuco Canyon, CA (US); Jon A. Magnuson, Corona del Mar, CA (US)

(73) Assignee: The Boeing Company, Chicago, IL (US)

(*) Notice: Subject to any disclaimer, the term of this patent is extended or adjusted under 35 U.S.C. 154(b) by 147 days.

(21) Appl. No.: 13/767,252

(22) Filed: Feb. 14, 2013

(65) Prior Publication Data

US 2014/0053729 A1 Feb. 27, 2014

Related U.S. Application Data

(60) Provisional application No. 61/692,590, filed on Aug. 23, 2012.

(51) Int. Cl.
*B01D 53/04* (2006.01)
*B01D 53/00* (2006.01)
*B01D 53/92* (2006.01)

(52) U.S. Cl.
CPC ............. *B01D 53/0462* (2013.01); *Y02C 10/08* (2013.01); *B01D 53/002* (2013.01); *B01D 53/04* (2013.01); *B01D 53/92* (2013.01); *B01D 2257/504* (2013.01); *B01D 2257/80* (2013.01); *B01D 2259/40088* (2013.01)

(58) Field of Classification Search
USPC .............. 96/132, 143, 146; 95/117, 139, 148; 423/230
See application file for complete search history.

(56) References Cited

U.S. PATENT DOCUMENTS

| | | | |
|---|---|---|---|
| 3,359,707 A | 12/1967 | Louis | |
| 4,094,652 A | 6/1978 | Lowther | |
| 4,249,915 A | 2/1981 | Sircar et al. | |
| 4,312,641 A * | 1/1982 | Verrando et al. | 95/105 |
| 4,322,394 A | 3/1982 | Mezey et al. | |
| 4,726,815 A | 2/1988 | Hashimoto et al. | |
| 4,784,672 A | 11/1988 | Sircar | |
| 4,832,711 A * | 5/1989 | Christel et al. | 95/14 |
| 5,282,886 A * | 2/1994 | Kobayashi et al. | 95/131 |
| 6,022,399 A * | 2/2000 | Ertl et al. | 95/114 |

(Continued)

FOREIGN PATENT DOCUMENTS

| | | |
|---|---|---|
| DE | 4003533 | 8/1990 |
| DE | 4003533 A1 | 8/1990 |

(Continued)

OTHER PUBLICATIONS

Extended European Search Report, EP 14 15 4014 (2014).

(Continued)

*Primary Examiner* — Frank Lawrence
(74) *Attorney, Agent, or Firm* — Walters & Wasylyna LLC

(57) ABSTRACT

A system for collecting carbon dioxide from a process gas including an adsorbent material for adsorbing carbon dioxide molecules from the process gas, a dielectric heater proximate the adsorbent material, and a vessel having an internal volume enclosing the adsorbent material and, optionally, the dielectric heater.

17 Claims, 4 Drawing Sheets

(56) References Cited

U.S. PATENT DOCUMENTS

| | | | |
|---|---|---|---|
| 6,183,539 B1 * | 2/2001 | Rode et al. | 95/117 |
| 6,502,328 B1 * | 1/2003 | Love et al. | 34/473 |
| 6,621,848 B1 | 9/2003 | Ullman et al. | |
| 7,947,120 B2 | 5/2011 | Deckman et al. | |
| 8,435,335 B2 * | 5/2013 | Lam et al. | 96/126 |
| 2005/0121393 A1 | 6/2005 | Galbraith | |
| 2013/0047664 A1 | 2/2013 | DiCenzo et al. | |

FOREIGN PATENT DOCUMENTS

| | | |
|---|---|---|
| GB | 2171927 | 9/1986 |
| WO | 2013/010328 | 1/2013 |

OTHER PUBLICATIONS

Extended European Search Report issued in EP12180636.8 (Dec. 14, 2012).

Amato et al., "Methane Oxycombustion for Low $CO_2$ Cycles: Blowoff Measurements and Analysis," *Journal of Engineering for Gas Turbines and Power*, vol. 133 (Jun. 2011).

Smardzewski et al., "A Laboratory Study of the Dielectric Heating of Molecular Sieve Material," *Naval Research Laboratory*, (May 27, 1980).

Choi et al., "Adsorbent Materials for Carbon Dioxide Capture from Large Anthropogenic Sources," *ChemSusChem Journal*, vol. 2, pp. 796-854 (2009).

Konduru et al., "Curbing Greenhouse Effect by Carbon Dioxide Adsorption with Zeolite 13x," *AIChE Journal*, vol. 53, No. 12 (2007).

Cavenati et al., "Adsorption Equilibrium of Methane, Carbon Dioxide, and Nitrogen on Zeolite 13X at High Pressures," Journal of Chemical Engineering Data, vol. 49, pp. 1095-1101 (2004).

Siemons et al., "Assessing the Kinetics and Capability of Gas Adsorption in Coals by a Combined Adsorption/Diffusion Method," *SPE Annual Technical Conference and Exhibition* (Denver, CO, 2003).

\* cited by examiner

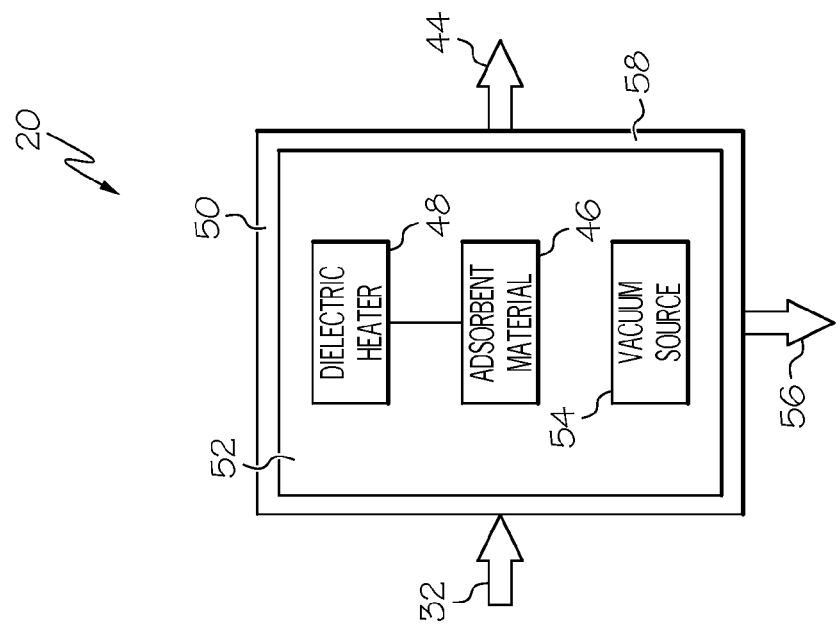
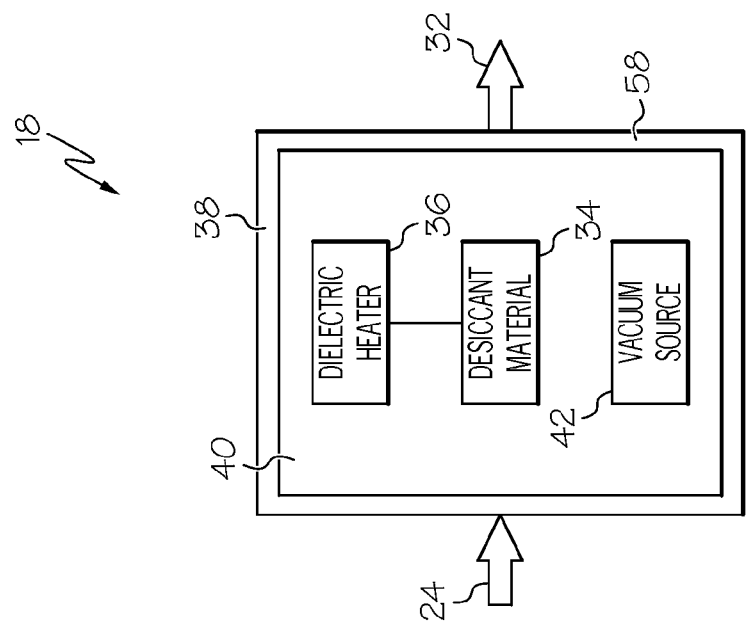

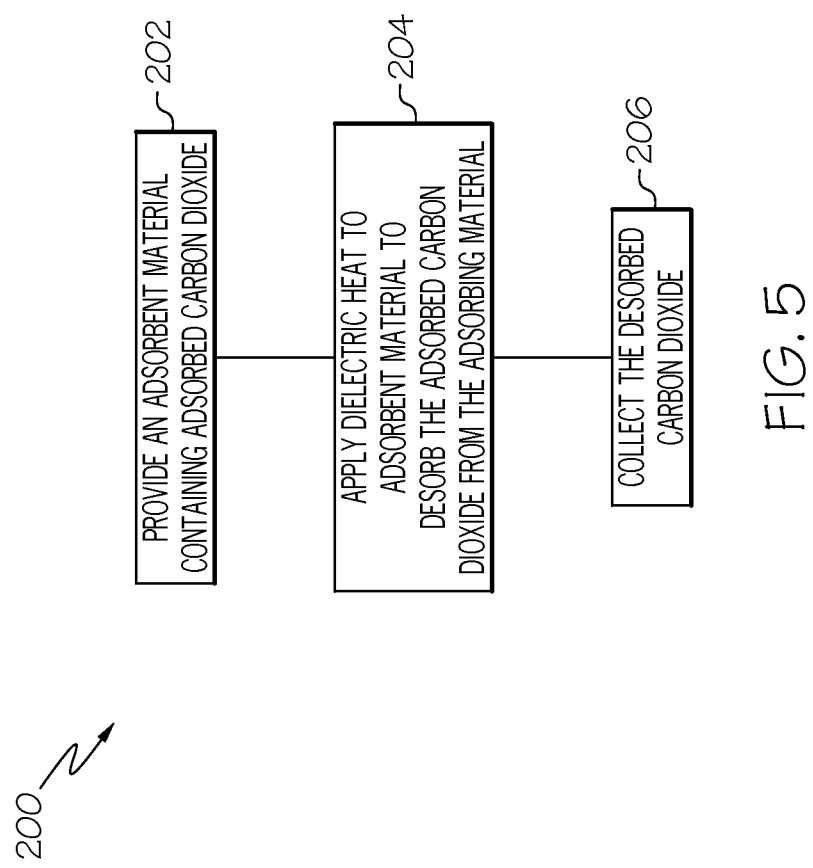

SYSTEM AND METHOD FOR COLLECTING CARBON DIOXIDE UTILIZING DIELECTRIC HEATING

PRIORITY

This application claims priority from U.S. Ser. No. 61/692,590 filed on Aug. 23, 2012.

FIELD

This application is directed to carbon dioxide collection and, more particularly, to the use of dielectric heating to recover collected carbon dioxide from an adsorbent material.

BACKGROUND

Certain molecules, such as carbon dioxide or water, may be targeted and collected from gas streams for a variety of applications. For example, carbon dioxide may be collected as a byproduct of industrial processes and to remove excess carbon dioxide from a supply of air.

Carbon dioxide may be obtained from various sources using various techniques. Traditional carbon dioxide collection techniques may be very energy intensive, particularly when run on an industrial scale. The two most demanding energy requirements for carbon dioxide collection are typically the energy required to drive a gas stream past or through a collecting medium and the energy required to regenerate and capture the carbon dioxide from the collecting medium. Therefore, carbon dioxide material costs may become significant, particularly when large quantities are used.

One method for collecting carbon dioxide employs a molecular sieve to adsorb the carbon dioxide molecules. Removal of the adsorbed carbon dioxide requires a significant amount of energy. Such energy is usually supplied by radiant heating and/or by pulling the molecules off using a high vacuum.

However, heating the system requires significant energy and, therefore, is inefficient. It also requires the structural components of the system be designed such that all the component parts can rapidly and efficiently radiate heat evenly throughout the system. This usually requires a metallic system, a plurality of radiant heaters, and a supply of electrical power. Additionally, since most molecular sieves are made from ceramic materials, which are normal insulators, they do not conduct heat easily and must be designed in close proximity to multiple heat sources.

Further, since molecular sieves are also porous materials that have polar charges, they also have an affinity to hold other charged molecules. This can make the molecular sieve less likely to release charged molecules, such as water. Therefore, certain target molecules may require even higher temperatures to be released, thus requiring more energy.

An additional energy source, such as a high vacuum, may also be required to effectively release the molecules. Utilization of a vacuum adds additional costs to the system by requiring additional energy for operation and additional structural components. The molecular sieve must be housed in a chamber that is capable of withstanding lower pressures, thus the chamber must be reinforced and vacuum valves and seals must be added.

Known carbon dioxide collection systems commonly operate by passing a gas stream through a collection bed to adsorb the carbon dioxide from the gas stream. The carbon dioxide would then have to be recovered, or desorbed, from the collection bed by heat, vacuum, or a combination of the two. This would have to be accomplished within a chamber that is capable of sustaining a vacuum. Thus a thick, heavy walled chamber, usually made of metal, that is capable of withstanding thermal exposure and high vacuum without distortion is required. After a period of time, the adsorbed carbon dioxide is released into the chamber. The time period required is dependent on various factors, such as on the gas adsorbed and the conditions used to release the molecules. For example, the higher the temperature the faster the time, but more energy input is required at a higher operational cost. As another example, the lower the vacuum the faster the time, but more energy input is required at a higher operational cost and at a higher cost for the vacuum chamber and associated vacuum components.

According, those skilled in the art continue with research and development efforts in the field of carbon dioxide collection.

SUMMARY

In one embodiment, the disclosed system for collecting carbon dioxide from a process gas may include an adsorbent material for adsorbing carbon dioxide molecules from the process gas, a dielectric heater proximate the adsorbent material to desorb the carbon dioxide from the adsorbent material, and a vessel having an internal volume enclosing the adsorbent material.

In another embodiment, the disclosed system for collecting carbon dioxide from a process gas may include a condenser for removing heat from the process gas, a desiccant chamber having a desiccant material for adsorbing water from the process gas to produce a substantially dry gas and a first dialectic heater for desorbing the water from the desiccant material, and a contact chamber having an adsorbent material for adsorbing carbon dioxide from the dry gas and a second dielectric heater for desorbing the carbon dioxide from the adsorbent material.

In yet another embodiment, disclosed is a method for desorbing carbon dioxide collected on an adsorbing material, the method may include the steps of: (1) providing an adsorbent material; (2) adsorbing carbon dioxide onto the adsorbent material, and (3) dielectrically heat the adsorbed carbon to effect desorption.

Other aspects of the disclosed system and method for collecting carbon dioxide will become apparent from the following detailed description, the accompanying drawings and the appended claims.

BRIEF DESCRIPTION OF THE DRAWINGS

FIG. 2 is a schematic block diagram of an embodiment of the disclosed desiccant chamber;

FIG. 3 is a schematic block diagram of an embodiment of the disclosed contact chamber;

DETAILED DESCRIPTION

Figure 1:
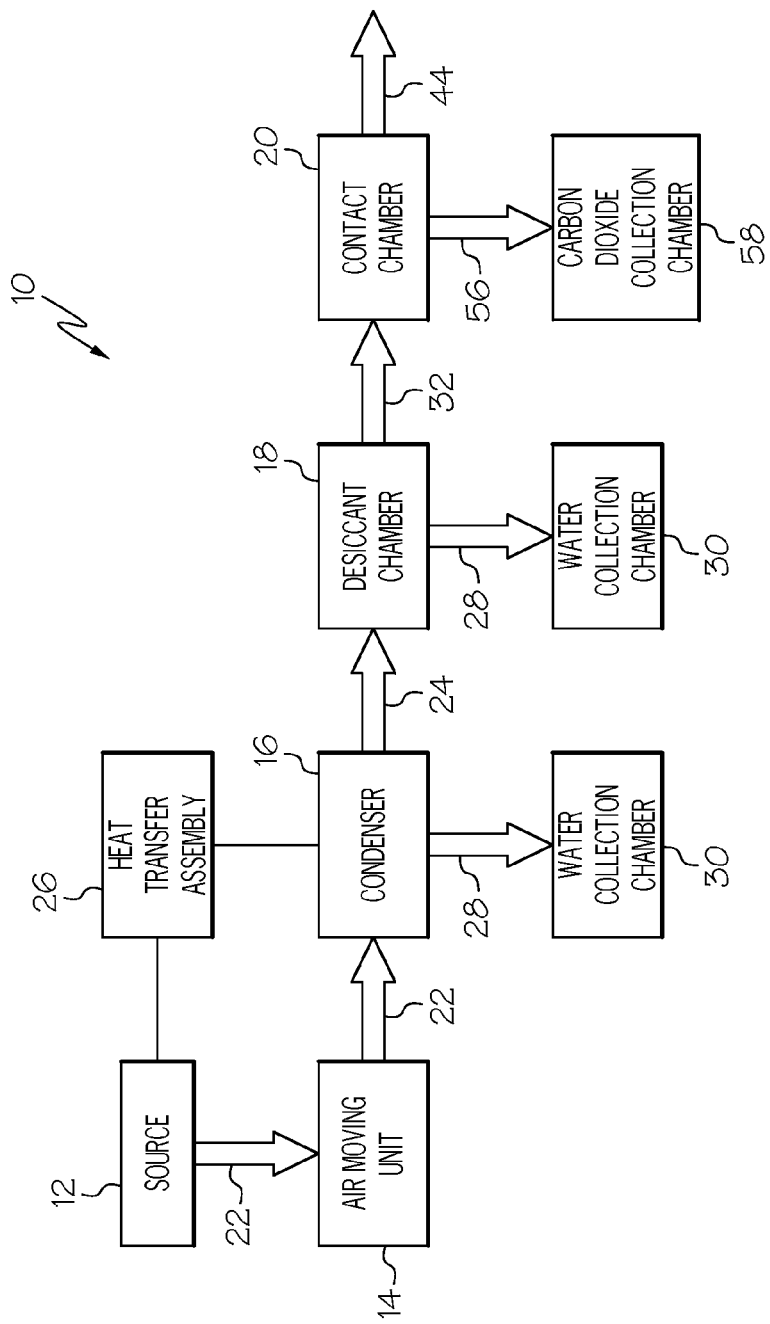
FIG. 1 is a schematic block diagram of an embodiment of the disclosed system for collecting carbon dioxide.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed system for collecting carbon dioxide, generally designated 10, may include a gas source 12 and a contact chamber 20. Optionally, the system 10 may also include an air moving unit 14, a condenser 16, and a desiccant chamber 18. Additional subsystems may be incorporated into the system 10 without departing from the scope of the present disclosure.

The system 10 may drive a stream of process gas 22 through a series of controlled environments until at least a portion of target molecules is collected from the process gas 22 and released. As further described herein, examples of target molecules that may be collected by the system 10 include water vapor and carbon dioxide.

The gas source 12 may be a source of the process gas 22. The process gas 22 may be any gas having one or more target molecules, such as carbon dioxide-containing gas, water vapor-containing gas, and the like. For example, the process gas 22 may be a gaseous mixture, and may include carbon dioxide as well as other constituents, such as water vapor, nitrogen, oxygen, other rare gases, and the like.

In one implementation, the gas source 12 may be a power plant and the process gas 22 may be the effluent from the power plant. For example, the power plant may be a hydrocarbon-burning power plant, such as a natural gas power plant, and the process gas 22 may be the combustion byproducts of the hydrocarbon-burning power plant. Therefore, the process gas 22 may be at a relatively high temperature relative to ambient conditions, and may include significant quantities of carbon dioxide as a result of the combustion reaction of oxygen with the hydrocarbon. As an example, the process gas 22 may have a water vapor to carbon dioxide ratio equal to or less than one (1) by weight.

The process gas 22 may be at an elevated temperature relative to ambient conditions such that the process gas 22 contains excess heat. In one expression, the process gas 22 may be at a temperature of at least 25° C. In another expression, the process gas 22 may be at a temperature of at least 50° C. In another expression, the process gas 22 may be at a temperature of at least 100° C. In another expression, the process gas 22 may be at a temperature of at least 200° C. In another expression, the process gas 22 may be at a temperature of at least 300° C. In another expression, the process gas 22 may be at a temperature of at least 400° C. In yet another expression, the process gas 22 may be at a temperature of at least 500° C.

In another implementation, the gas source 12 may be cold, dry ambient air. In one expression, the process gas 22 may be at a temperature of at least 5° C. In another expression, the process gas 22 may be at a temperature of at least 10° C. In another expression, the process gas 22 may be at a temperature of at least 20° C.

The air moving unit 14, while optional, may facilitate the transfer of the process gas 22 from the gas source 12 through the system 10. The air moving unit 14 may be a fan, a blower or the like, and may control the flow (e.g., the flow rate) of the process gas 22 to the condenser 16. The use of multiple air moving units 14 is also contemplated.

Optionally, separating devices (not shown), such a scrubbers, may be used between the gas source 12 and the condenser 16 to remove contaminants (e.g., metals) from the effluent before the process gas 22 enters the system 10.

The condenser 16 may receive the process gas 22 and may condense the water vapor in the process gas 22 to output a partially (if not fully) dry gas 24. Various condenser types and configurations may be used, and use of a single stage or multi-stage condenser 16 is also contemplated.

The condenser 16 may condense the water vapor in the process gas 22 by cooling the process gas 22. Optionally, the heat extracted from the process gas 22 by the condenser 16 during cooling may be transferred to a heat transfer assembly 26 for further thermal use.

Thus, the condenser 16 may lower the temperature of the process gas 22. In one expression, the condenser 16 may lower the temperature of the process gas 22 by at least 10° C. In another expression, the condenser 16 may lower the temperature of the process gas 22 by at least 20° C. In another expression, the condenser 16 may lower the temperature of the process gas 22 by at least 30° C. In another expression, the condenser 16 may lower the temperature of the process gas 22 by at least 40° C. In another expression, the condenser 16 may lower the temperature of the process gas 22 by at least 50° C. In another expression, the condenser 16 may lower the temperature of the process gas 22 by at least 100° C. In another expression, the condenser 16 may lower the temperature of the process gas 22 by at least 150° C. In yet another expression, the condenser 16 may lower the temperature of the process gas 22 by at least 200° C.

Optionally, any water 28 removed from the process gas 22 by the condenser 16 may be collected as a byproduct of the system 10. The water 28 may be collected in a water collection chamber 30 and may then be reused for any suitable purpose. Alternatively, the water 28 may be discharged to a drain.

Referring to FIG. 2, the desiccant chamber 18 may receive the partially dry gas 24, from either the gas source 12 or the condenser 16, and may output a substantially dry gas 32. The desiccant chamber 18 may include a desiccant material 34 selected to remove substantially all of the water remaining in the partially dry gas 24, at least one dielectric heater 36, and a closed vessel 38 defining a hollow internal volume 40 for enclosing the desiccant material 34 and, optionally, the dielectric heater 36.

Various desiccant materials 34 may be used in the desiccant chamber 18 to primarily target water molecules without departing from the scope of the present disclosure. In one particular implementation, the desiccant material 34 may be (or may include) an adsorbent material, such as a molecular sieve material. As one example, the desiccant material 34 may be (or may include) a porous ceramic material. As another example, the desiccant material 34 may be (or may include) a molecular sieve material with an alkali metal alumino-silicate structure, which may have an effective pore opening size of about 2 to about 5 angstroms (e.g., 3 angstroms). As yet another example, the desiccant material 34 may be (or may include) a zeolite material, such as zeolite 3A.

The desiccant material 34 in the desiccant chamber 18 may be structured in various ways. As one example, the desiccant material 34 may be configured as a solid monolithic structure. As another example, the desiccant material 34 may be configured as pellets, powder and/or spherical extrudates in a packed bed.

The desiccant material 34 may become exhausted after collecting a certain quantity of water and, therefore, may require regeneration. When a sufficient amount of water has been adsorbed onto the desiccant material 34, a desorbing process may be initiated to release the water from the desiccant material 34. The desorbing process may be effected by applying electromagnetic radiation to the desiccant material 34 in order to heat the adsorbed water. The process of desorbing the adsorbed water from the desiccant material 34 may regenerate the desiccant material 34, thereby allowing further use of the desiccant material 34.

The adsorbed water may be released from the desiccant material 34, within the desiccant chamber 18, in response to the dielectric heating. When subjecting the desiccant material 34 to dielectric heat, electromagnetic radiation may be directed to the water adsorbed onto the desiccant material 34 by the dielectric heater 36 to heat the adsorbed water and promote the release of the water from the desiccant material 34. Other techniques, such as applying a low vacuum, may also be used to promote the release of the adsorbed water and regenerate the desiccant material 36. For example, an optional vacuum source 42 may be utilized to draw a vacuum within the internal volume 40 of the vessel 38. Combinations of desorption techniques, such as dielectric heat and vacuum, are contemplated.

Any water 28 (FIG. 1) removed from the partially dry gas 24 at the desiccant chamber 18 may be collected in the water collection chamber 30 (FIG. 1).

Thus, the condenser 16 and the desiccant chamber 18 may remove substantially all of the water originally contained in the process gas 22. The resulting dry gas 32 may then be used for carbon dioxide collection. While use of the condenser 16 and the desiccant chamber 18 is optional, one benefit of the disclosed system 10 is the cost effectiveness of carbon dioxide collection where the ratio of water vapor to carbon dioxide in the dry gas 30 is equal or less than one by weight.

Referring to FIG. 3, the contact chamber 20 may receive the dry gas 32, from the gas source 12, the condenser 16 or the desiccant chamber 18, and may output a substantially carbon dioxide-free dry gas 44. The contact chamber 20 may include an adsorbent material 46 selected to adsorb substantially all the carbon dioxide from the dry gas 32, at least one dielectric heater 48, and a closed vessel 50 defining a hollow internal volume 52 for enclosing the adsorbent material 46 and, optionally, the dielectric heater 48. The adsorbent material 46 may adsorb carbon dioxide from the dry gas 32.

While reference is made to a substantially carbon dioxide-free dry gas 44 being output from the contact chamber 20, it is also contemplated that only a portion of the carbon dioxide in the dry gas 32 may be adsorbed in the contact chamber 20. Therefore, in one variation, the "substantially carbon dioxide-free dry gas 44" may not be substantially free of carbon dioxide, but rather may contain significant quantities of carbon dioxide.

A variety of adsorbent materials 46 may be suitable for use in the contact chamber 20 to primarily target carbon dioxide molecules from the dry gas 32. As one example, the adsorbent material 46 may be (or may include) a molecular sieve material. As another example, the adsorbent material 46 may be (or may include) a porous ceramic material. As another example, the adsorbent material 46 may be (or may include) a molecular sieve material with an alkali metal alumino-silicate structure, which may have an effective pore opening size of about 8 to about 13 angstroms (e.g., 10 angstroms). As yet another example, the adsorbent material 46 may be (or may include) a zeolite material, such as zeolite 13X.

The adsorbent material 46 in the contact chamber 20 may be structured in various ways. As one example, the adsorbent material 46 may be configured as a solid monolithic structure. As another example, the adsorbent material 46 may be configured as pellets, powder and/or spherical extrudates in a packed bed.

The adsorbent material 46 may become exhausted after collecting a certain quantity of carbon dioxide and, therefore, may require regeneration. When a sufficient amount of carbon dioxide has been adsorbed onto the adsorbent material 46, a desorbing process may be initiated to release the carbon dioxide from the adsorbent material 46. The desorbing process may be effected by applying electromagnetic radiation to the adsorbent material 46 in order to heat to the adsorbed carbon dioxide. The process of desorbing the adsorbed carbon dioxide from the adsorbent material 46 may regenerate the adsorbent material 46, thereby allowing further use of the adsorbent material 46.

The adsorbed carbon dioxide may be released from the adsorbent material 46, within the contact chamber 20, by way of the dielectric heater 48. When subjecting the adsorbent material 46 to dielectric heat, electromagnetic radiation may be directed to the carbon dioxide adsorbed onto the adsorbent material 46 by the dielectric heater 48 to heat the adsorbed carbon dioxide and promote the release of the carbon dioxide molecules from the adsorbent material 46. Other techniques, such as applying a vacuum, may also be used to release the captured carbon dioxide and regenerate the adsorbent material 48.

For example, a vacuum source 54 may be utilized to draw a low vacuum within the internal volume 52 of the vessel 50. The contact chamber 20 may be substantially sealed to the flow of gas, and a vacuum may be drawn in the contact chamber 20 by way of the vacuum source 54. Therefore, the applied vacuum may facilitate the process of desorbing carbon dioxide from the adsorbent material 48. Combinations of techniques, such as dielectric heat and vacuum, are contemplated.

Thus, the contact chamber 20 may remove a majority (if not substantially all) of the carbon dioxide originally contained in the process gas 22. Optionally, the gaseous carbon dioxide 56 removed by the contact chamber 20 may be released and collected in the carbon dioxide collection chamber 58 (FIG. 1). The vacuum source 54 may also assist in the collection of the gaseous carbon dioxide 56 in the carbon dioxide collection chamber 58. The collected gaseous carbon dioxide 56 and resulting carbon dioxide free gas 44 may then be sent for storage or for transport to a job site.

The gaseous carbon dioxide 56 may be transitioned to a solid using any suitable technique. For example, a cooled surface, such as a cold finger, may be positioned downstream of the contact chamber 20 to make contact with the gaseous carbon dioxide 56. The cooled surface may be cooled by a cryogenic pump that circulates a cold liquid through the cooled surface. The cooled surface may be cooled to a temperature that is sufficiently low to cause the gaseous carbon dioxide 56 to solidify on the cooled surface. Other techniques for solidifying the carbon dioxide are also contemplated. The solidified carbon dioxide may be extracted using any suitable method of collection. For example, the solidified carbon dioxide may be collected, either as a solid or by transitioning the carbon dioxide back to a gas (e.g., with heat).

The dielectric heaters 36, 48 may provide a high-frequency alternating field, radio wave, or microwave electromagnetic radiation to heat the adsorbed target molecules (e.g., water; carbon dioxide). The adsorbed target molecules may be polarized by an applied electrical field produced by the dielectric heaters 36, 48. The heating may be caused by molecular dipole rotation within the adsorbed target molecules.

The molecular rotation may occur in the adsorbed target molecules when the polar molecules align themselves with the electromagnetic field produced by the dielectric heater 36, 48. When the electromagnetic field is oscillating, the polar molecules rotate, thereby continuously aligning themselves with the electromagnetic field (i.e., dipole rotation). As the electromagnetic field alternates, the molecules reverse direction. Rotating molecules push, pull, and collide with other molecules distributing the energy to adjacent molecules, thereby producing energy that appears as heat.

For example, the dielectric heaters 36, 48 may include a high voltage power source (e.g., a transformer or an electronic power converter), which passes energy to a cavity magnetron. A high voltage capacitor may be connected to the magnetron and the power source. The magnetron may convert high-voltage electric energy to electromagnetic energy (e.g., microwave radiation). A control circuit (e.g., a microcontroller) may be used to control the magnetron. An emitter may be used to direct the electromagnetic energy toward the desiccant material 34 and/or the adsorbent material 46. A waveguide may also be use to control the direction of the electromagnetic energy targeting the desiccant material 34 and/or the adsorbent material 46. The closed vessels 38, 50 of the desiccant chamber 18 and contact chamber 20, respectively may act as a heating chamber. An interior surface of the vessel walls 58 (FIGS. 2 and 3) may be lined with metal to reflect the electromagnetic energy.

In one implementation the dielectric heater 36, 48 may produce electromagnetic waves having electric fields of high frequency and short wavelengths (e.g., microwaves). For example, the electromagnetic waves may be 2.45 gigahertz (GHz) with a wavelength of 122 millimeters. In another example, the electromagnetic waves may be 915 megahertz (MHz) with a wavelength of 328 millimeters. The microwaves may be launched at the desiccant material 34 and/or the adsorbent material 46 from a small emitter and conveyed through the internal volume 40, 52 of the vessel 38, 50 to the desiccant material 34 and adsorbent material 46, respectively.

The dielectric heaters 36, 48 may be operated at a minimum power level and time increment in order to release the adsorbed water and carbon dioxide from the desiccant material 34 and adsorbent material 46, respectively, with a minimal heating and under a minimal vacuum. By using the dielectric heaters 36, 48 the water molecules and/or the carbon dioxide molecules may be energized to a sufficient state such that they are released quickly from the desiccant material 34 and adsorbent material 46, respectively. By controlling the power and timing of the dielectric heater 36, 48, the amount of energy required to effect necessary heating can be minimized, thereby leading to a direct reduction in operating costs.

In an example of the system 10, water may be released from the desiccant material in approximately 3.5 minutes at −2 pounds per square inch gage (psig). In another example of the system 10, carbon dioxide may be released from the adsorbent material in approximately 1.5 minutes at atmospheric pressure.

Furthermore, the use of dielectric heating at low vacuum pressure or atmospheric pressure also reduces material costs of the system 10, particularly of the walls 58 (FIGS. 2 and 3) of the vessels 38, 50 of the desiccant chamber 18 and contact chamber 20, respectively. The vessel walls 58 may be constructed of an inexpensive, polymer-based thin material.

It can be appreciated by one skilled in the art that use of the condenser 16, heat transfer assembly 26, and desiccant chamber 18 may not be required for use in the system 10 for collecting carbon dioxide from the process gas 22 and use of such components may depend on various factors, including the characteristics of the process gas 22, particularly the amount of water and the temperature of the process gas 22.

As such, while not explicitly shown, the system 10 may include only the gas source 12 and the contact chamber 20, which may utilize the adsorbent material 46 to adsorb carbon dioxide from the carbon dioxide containing process gas 22, and the dielectric heater 48 to release the adsorbed carbon dioxide.

Figure 4:
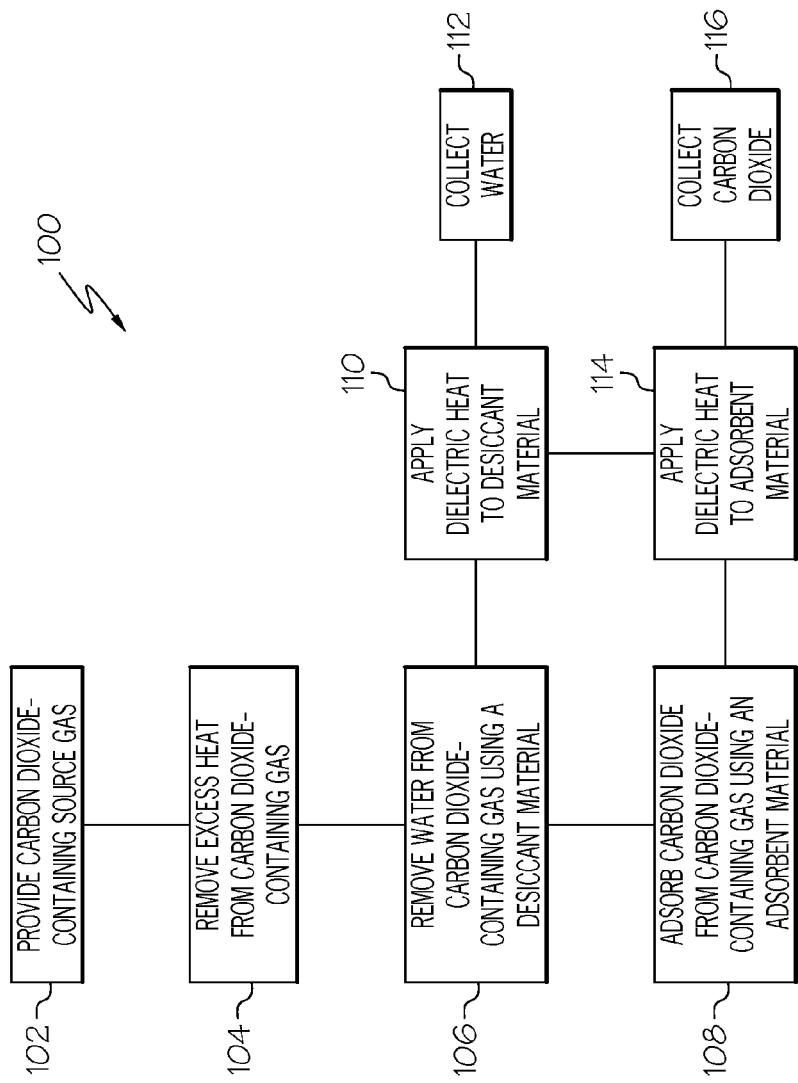
FIG. 4 is a flow chart illustrating an embodiment of the disclosed method for collecting carbon dioxide; and, FIG. 5 is a flow chart illustrating an embodiment of the disclosed method for desorbing carbon dioxide collected on an adsorbing material.

Referring to FIG. 4, also disclosed is a method, generally designed 100, for collecting carbon dioxide. The method 100 may begin at block 102 with the step of providing a carbon dioxide-containing process gas. As described above, the carbon dioxide-containing process gas may be the hot effluent from a power plant, such as a hydrocarbon-burning power plant. Use of other carbon dioxide-containing process gases is also contemplated.

As shown at block 104, optionally, excess heat and water may be removed from the carbon dioxide-containing process gas. For example, excess heat may be removed using a condenser, as described above, which may also beneficially remove some (if not all) of the water vapor from the carbon dioxide-containing process gas.

As shown at block 106, water may be removed from the carbon dioxide-containing process gas. The step of removing water may be performing using a desiccant material to adsorb water, as described above.

As shown at block 110, the adsorbed water may be desorbed from the desiccant material by dielectric heating. Optionally, a vacuum may also be applied to promote desorption of water from the desiccant material. Then, as shown in block 112, the released water may be collected or discharged to a drain.

As shown at block 108, carbon dioxide may be removed from the carbon dioxide-containing process gas. The step of removing carbon dioxide may be performing using an adsorbent material, as described above.

As shown at block 114, the adsorbed carbon dioxide may be desorbed from the adsorbent material by dielectric heating. Optionally, a vacuum may also be applied to promote desorption of carbon dioxide from the adsorbent material. Then, as shown in block 116, the desorbed carbon dioxide may be collected.

Referring to FIG. 5, also disclosed is a method, generally designed 200, for desorbing carbon dioxide collected on an adsorbent material. The method 200 may begin at block 202 with the step of providing an adsorbent material comprising an amount of adsorbed carbon dioxide. As shown at block 204, dielectric heat may be applied to the adsorbent material, such as by a dielectric heater, to desorb carbon dioxide from the adsorbent material. Optionally, a vacuum may also be applied to promote desorption of carbon dioxide from the adsorbent material. As shown at block 206, the desorbed carbon dioxide may be collected.

Accordingly, the disclosed systems and methods may use dielectric heating to quickly and efficiently release adsorbed target molecules, such as water or carbon dioxide, faster than traditional methods and with less expensive energy requirements and structural materials due to the lack of necessity for high temperatures or vacuums.

Although various aspects of the disclosed system and method for collecting target molecules have been shown and described, modifications may occur to those skilled in the art upon reading the specification. The present application includes such modifications and is limited only by the scope of the claims.

What is claimed is:
1. A system for collecting target molecules from a process gas, said system comprising:
a vessel that defines an internal volume;
an adsorbent material for adsorbing said target molecules from said process gas, wherein said adsorbent material is configured as a solid monolithic structure and is positioned in said internal volume of said vessel; and a dielectric heater positioned in said internal volume of said vessel to dielectrically heat said target molecules adsorbed onto said adsorbent material; and a vacuum source for drawing a vacuum within said internal volume, wherein said vacuum is drawn while said dielectric heater heats said adsorbent material.

2. The system of claim 1 wherein said target molecules are carbon dioxide molecules.

3. The system of claim 1 wherein said target molecules are water molecules.

4. The system of claim 1 wherein said adsorbent material comprises a molecular sieve material.

5. The system of claim 1 wherein said adsorbent material comprises a zeolite material.

6. The system of claim 5 wherein said zeolite material comprises zeolite 13X.

7. The system of claim 5 wherein said zeolite material comprises zeolite 3A.

8. The system of claim 1 wherein said dielectric heater comprises an electromagnetic energy generator.

9. The system of claim 1 wherein said dielectric heater is directed at said adsorbent material.

10. A system for collecting carbon dioxide from a process gas, said system comprising:

a desiccant chamber comprising a desiccant material for adsorbing water from said process gas to produce a substantially dry gas and a first dielectric heater for desorbing said water from said desiccant material, wherein a vacuum is drawn within said desiccant chamber by way of an associated vacuum source when said first dielectric heater is heating; and, a contact chamber comprising an adsorbent material for adsorbing carbon dioxide from said dry gas and a second dielectric heater for desorbing said carbon dioxide from said adsorbent material, wherein said adsorbent material is configured as a solid monolithic structure, and wherein a vacuum is drawn within said contact chamber by way of an associated vacuum source when said second dielectric heater is heating.

11. The system of claim 10 wherein said adsorbent material comprises a zeolite material.

12. The system of claim 10 wherein said desiccant material comprises a zeolite material.

13. The system of claim 10 further comprising a condenser for removing heat from said process gas.

14. A method for collecting a target molecule from a process gas comprising the steps of:

placing an adsorbent material into a vessel, said adsorbent material being configured as a solid monolithic structure;

contacting said adsorbent material with said process gas, wherein at least a portion of said target molecule in said process gas adsorbs onto said adsorbent material during said contacting step;

dielectrically heating said adsorbed target molecule; and drawing a vacuum within said vessel during said dielectrically heating step.

15. The method of claim 14 wherein said adsorbent material comprises a molecular sieve material.

16. The method of claim 14 wherein said target molecule is carbon dioxide.

17. The method of claim 14 wherein said contacting step is repeated after said dielectrically heating step.

* * * * *